(12) United States Patent
Fujita et al.

(10) Patent No.: US 12,327,655 B2
(45) Date of Patent: Jun. 10, 2025

(54) CONNECTION PORTION FOR SUPERCONDUCTING WIRE AND METHOD FOR CONNECTING SUPERCONDUCTING WIRE

(71) Applicant: Hitachi High-Tech Corporation, Tokyo (JP)

(72) Inventors: Shinji Fujita, Tokyo (JP); Yota Ichiki, Tokyo (JP); Motomune Kodama, Tokyo (JP); Tsuyoshi Wakuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 212 days.

(21) Appl. No.: 18/022,328

(22) PCT Filed: Aug. 6, 2021

(86) PCT No.: PCT/JP2021/029424
§ 371 (c)(1),
(2) Date: Feb. 21, 2023

(87) PCT Pub. No.: WO2022/050000
PCT Pub. Date: Mar. 10, 2022

(65) Prior Publication Data
US 2023/0317318 A1   Oct. 5, 2023

(30) Foreign Application Priority Data

Sep. 3, 2020   (JP) ................. 2020-148180

(51) Int. Cl.
*H01B 12/08* (2006.01)
*H01B 1/02* (2006.01)

(52) U.S. Cl.
CPC ............... *H01B 12/08* (2013.01); *H01B 1/02* (2013.01)

(58) Field of Classification Search
CPC ............. H01B 12/08; H01B 1/02; H02G 1/14
See application file for complete search history.

(56) References Cited

U.S. PATENT DOCUMENTS

| | | | |
|---|---|---|---|
| 2003/0051901 A1* | 3/2003 | Morita | H01R 4/68 |
| | | | 174/125.1 |
| 2006/0240991 A1 | 10/2006 | Takahashi et al. | |

(Continued)

FOREIGN PATENT DOCUMENTS

| | | |
|---|---|---|
| JP | 2006174546 A | 6/2006 |
| JP | 2012094413 A | 5/2012 |

(Continued)

OTHER PUBLICATIONS

Jiaying Ling, et al., "Monofilament MgB2 Wire for a Whole-Body MRI Magnet: Superconducting Joints and Test Coils", IEEE Trans Appl Supercond. Jun. 2013; 23(3).

(Continued)

*Primary Examiner* — Sherman Ng
(74) *Attorney, Agent, or Firm* — MATTINGLY & MALUR, PC

(57) ABSTRACT

In the connection portion for a superconducting wire, a plurality of superconducting wires are integrated by a sintered body containing $MgB_2$, end portions of the superconducting wires each having an outer peripheral surface of a superconducting filament exposed are inserted into a container in parallel. The container has an opening having a diameter larger than a wire diameter of the superconducting wires on at least one side in a longitudinal direction of the superconducting wires, and the sintered body is in contact with the outer peripheral surfaces of the superconducting filaments. The method for connecting a superconducting wire includes: exposing the outer peripheral surfaces of the superconducting filaments; inserting the superconducting wires into the container; filling the container with a raw (Continued)

material; and heat-treating the raw material to generate the sintered body. The raw material is pressurized in parallel to the longitudinal direction of the superconducting wires and then heat-treated.

13 Claims, 16 Drawing Sheets

(56) References Cited

U.S. PATENT DOCUMENTS

| | | | | |
|---|---|---|---|---|
| 2008/0274900 | A1* | 11/2008 | Shimoyama | C04B 35/58057 419/7 |
| 2009/0264297 | A1* | 10/2009 | Nardelli | H10N 60/80 505/410 |
| 2010/0216645 | A1* | 8/2010 | Tenbrink | H10N 60/80 29/599 |
| 2010/0216647 | A1* | 8/2010 | Tenbrink | C04B 35/58057 164/76.1 |
| 2012/0108435 | A1 | 5/2012 | Ichiki et al. | |
| 2016/0293296 | A1* | 10/2016 | Ichiki | H01F 6/00 |
| 2018/0012682 | A1 | 1/2018 | Ichiki et al. | |
| 2019/0207331 | A1 | 7/2019 | Ichiki et al. | |

FOREIGN PATENT DOCUMENTS

| | | |
|---|---|---|
| JP | 2017208156 A | 11/2017 |
| WO | 2015/015627 A1 | 2/2015 |
| WO | 2016/143416 A1 | 9/2016 |
| WO | 2017/212869 A1 | 12/2017 |

OTHER PUBLICATIONS

International Search Report of PCT/JP2021/029424 dated Oct. 19, 2021.

* cited by examiner

[FIG. 1]
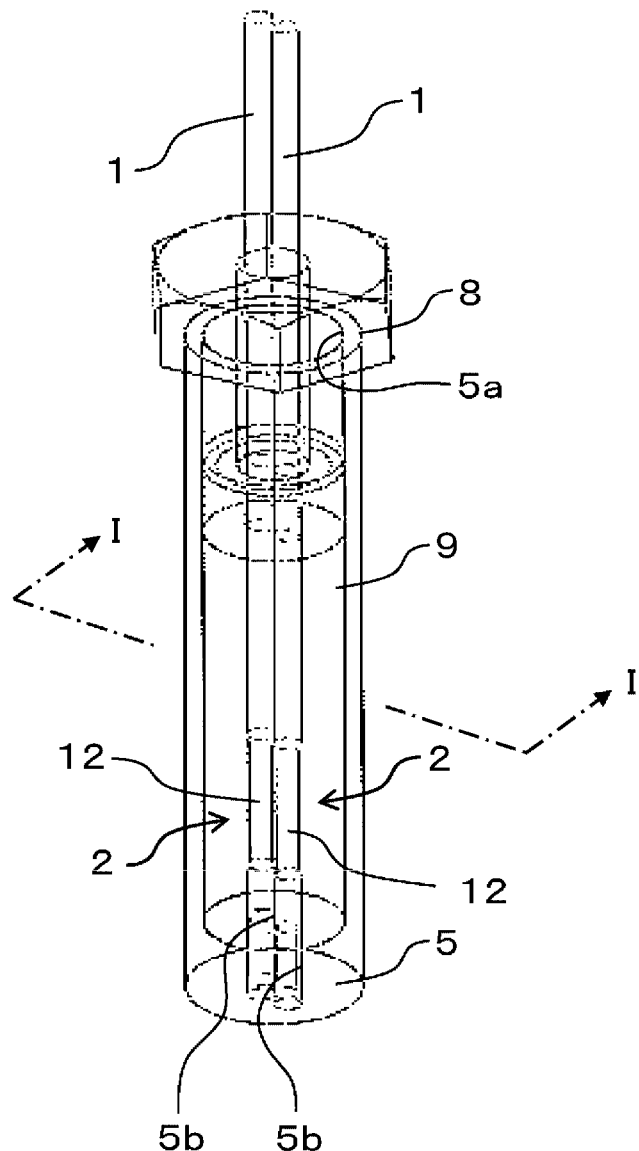

[FIG. 2]
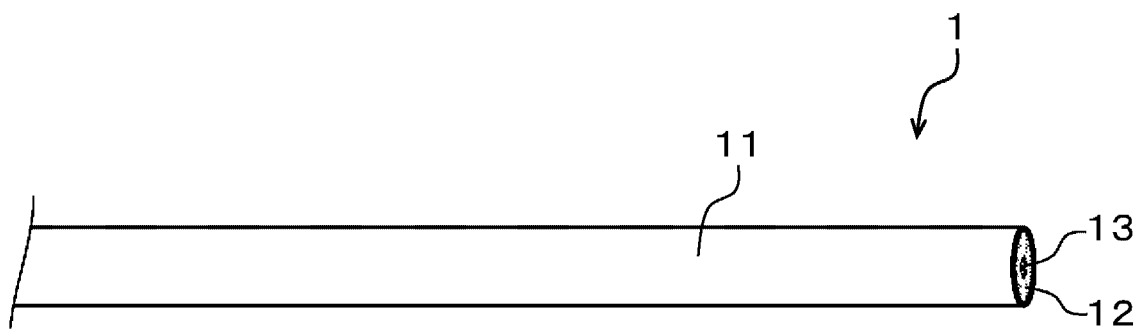
[FIG. 3]
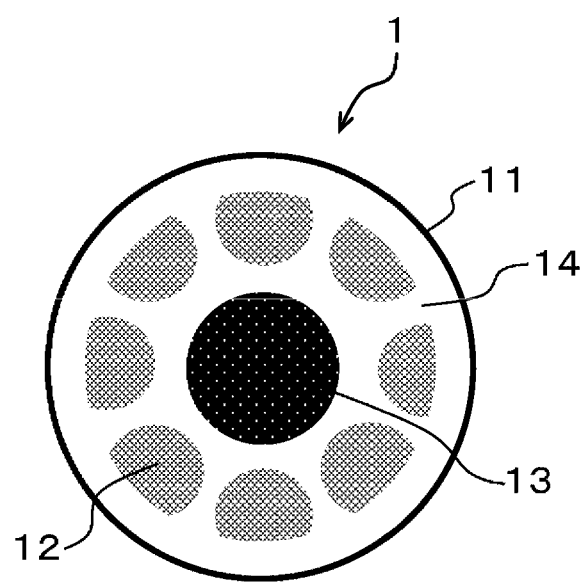

[FIG. 4]
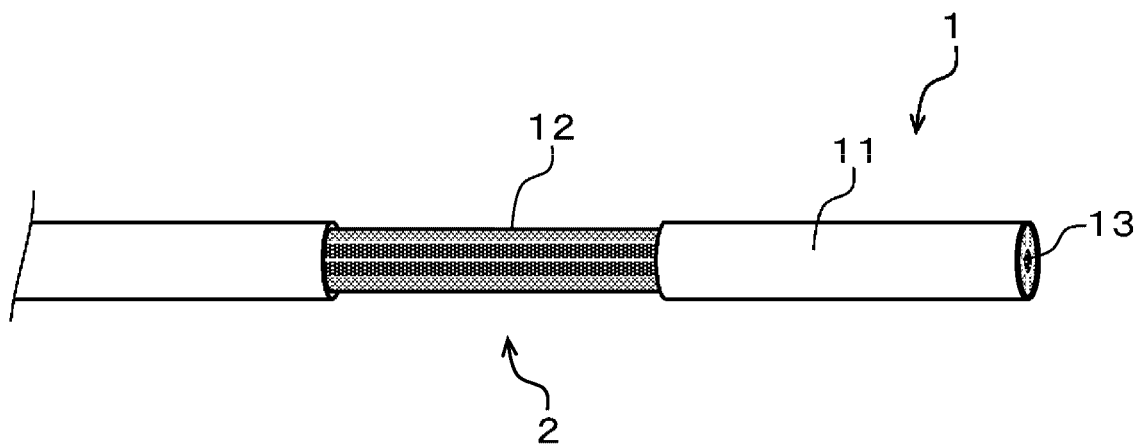

[FIG. 5]
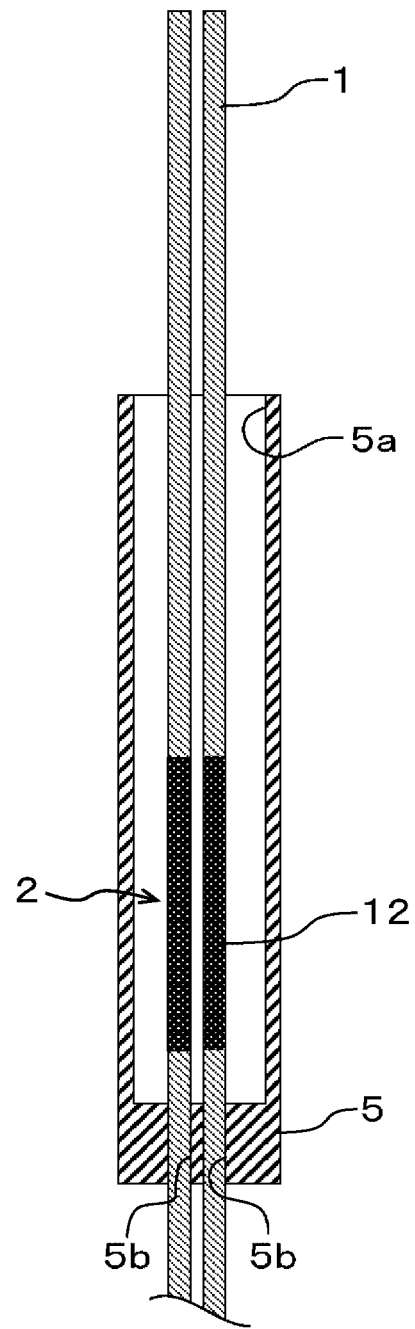

[FIG. 6]
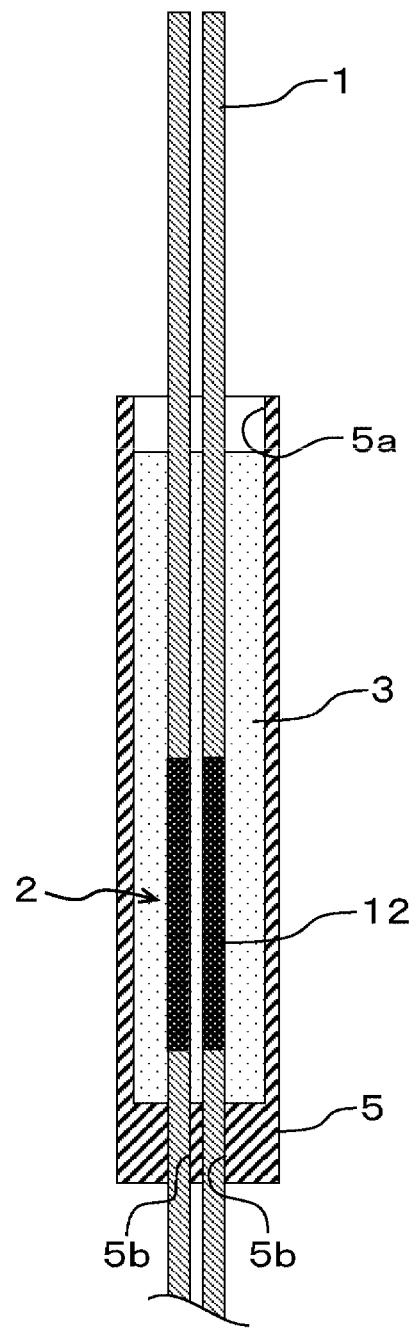

[FIG. 7]
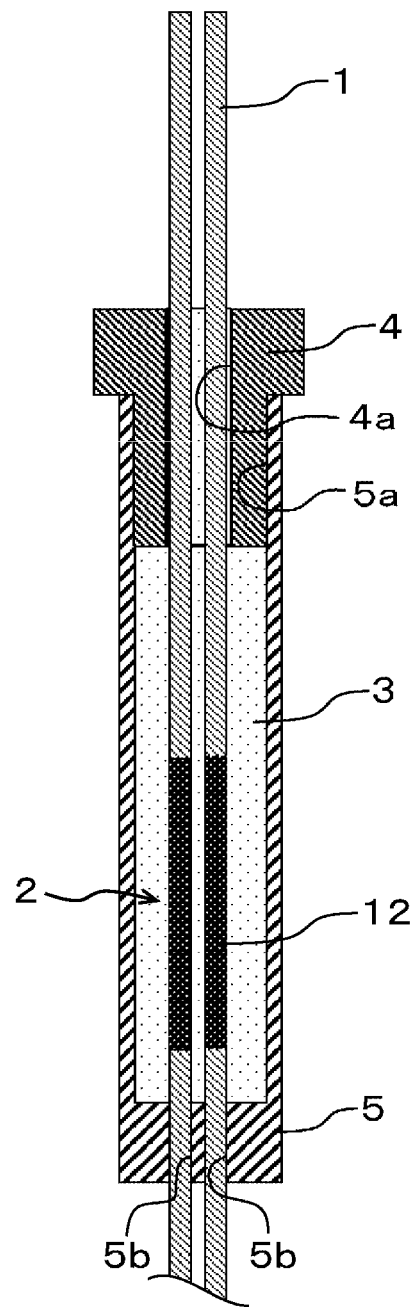

[FIG. 8]
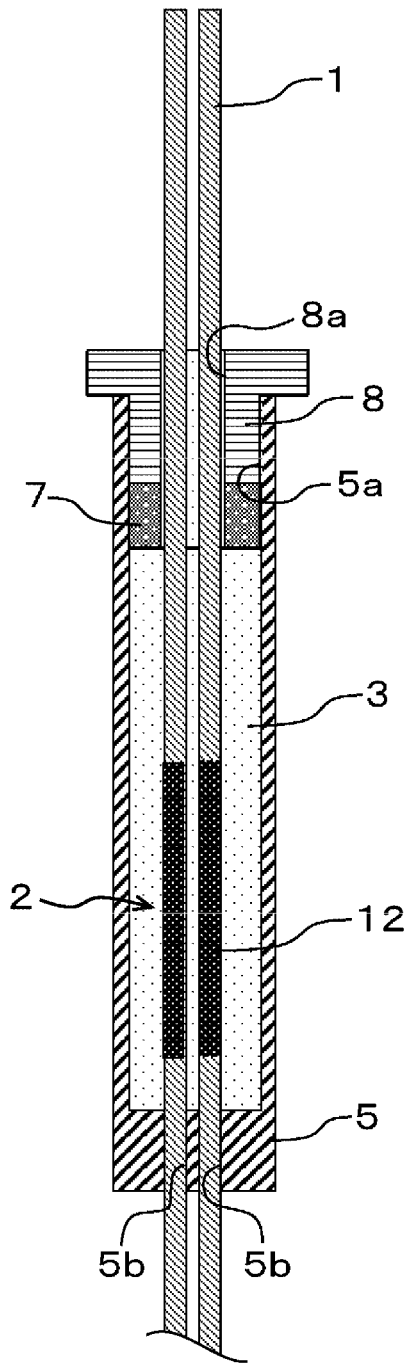

[FIG. 9]
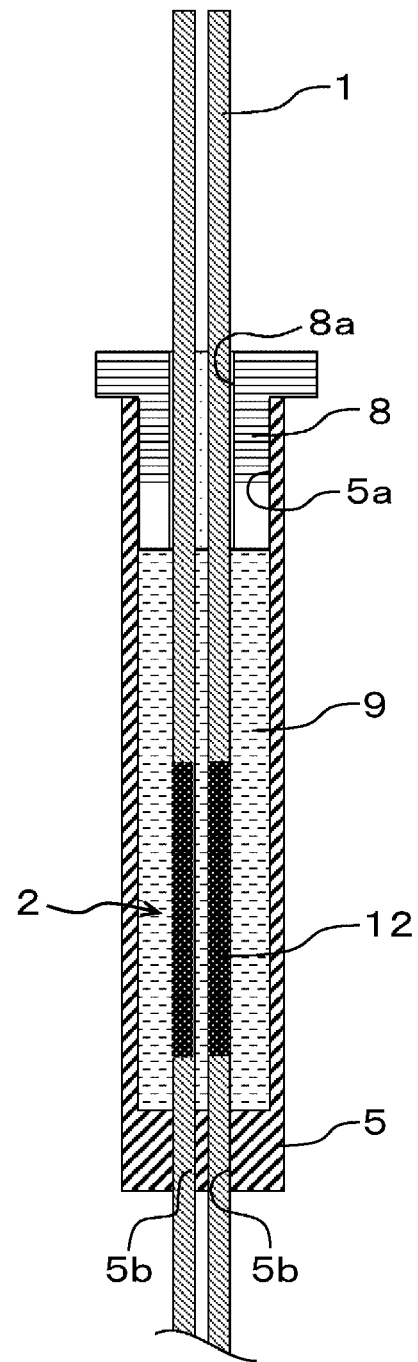

[FIG. 10]
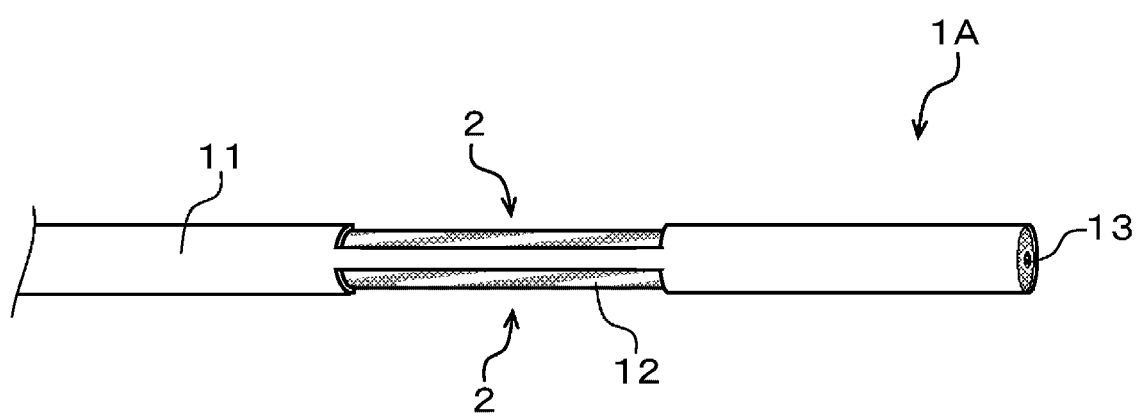

[FIG. 11]
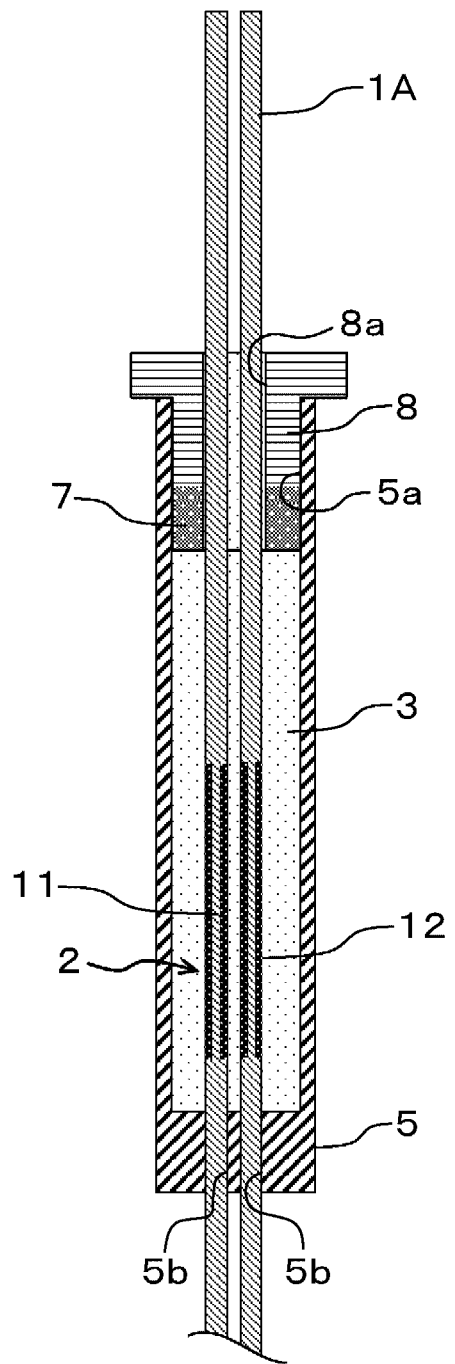

[FIG. 12]
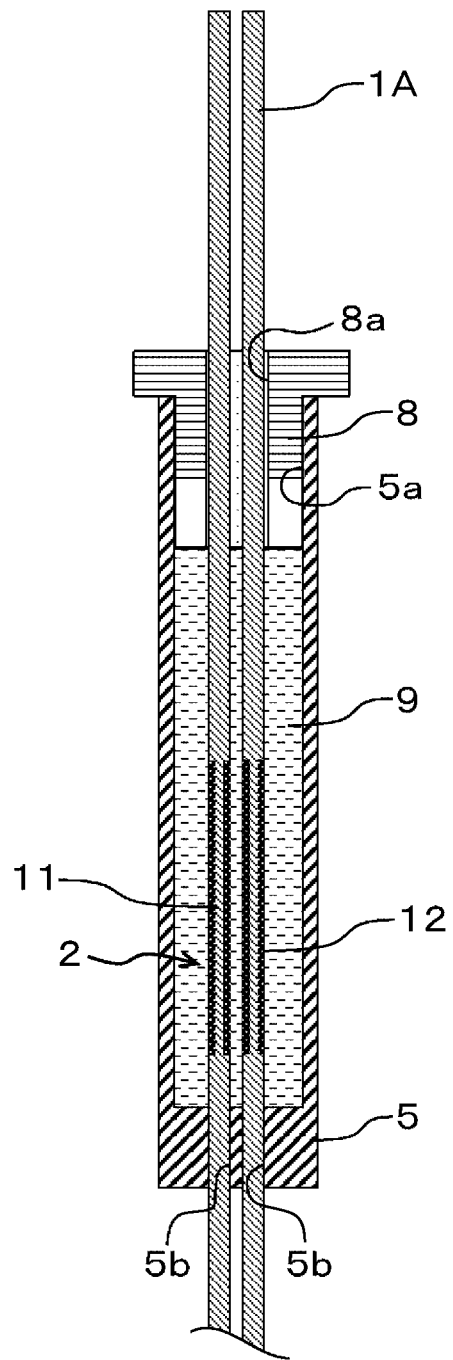

[FIG. 13]
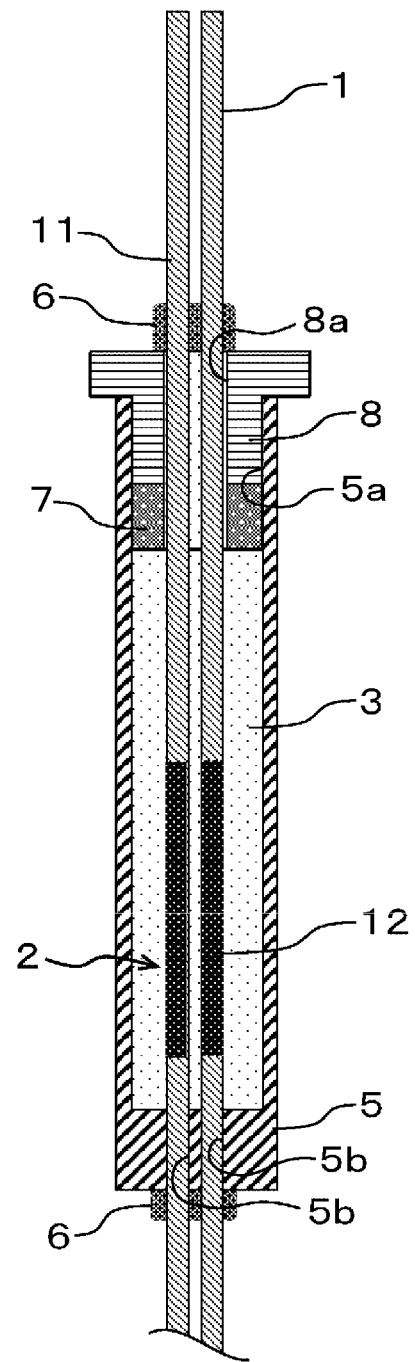

[FIG. 14]
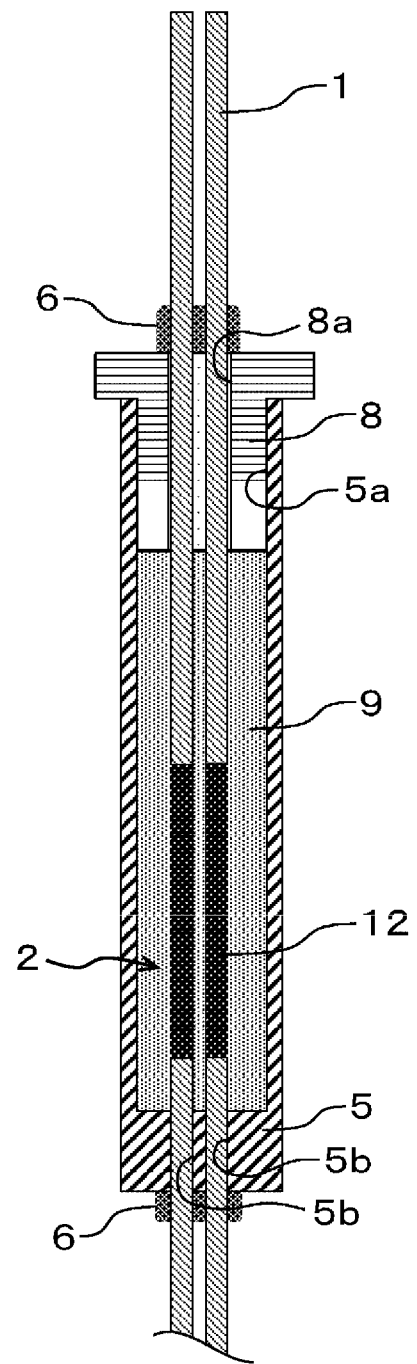

[FIG. 15]
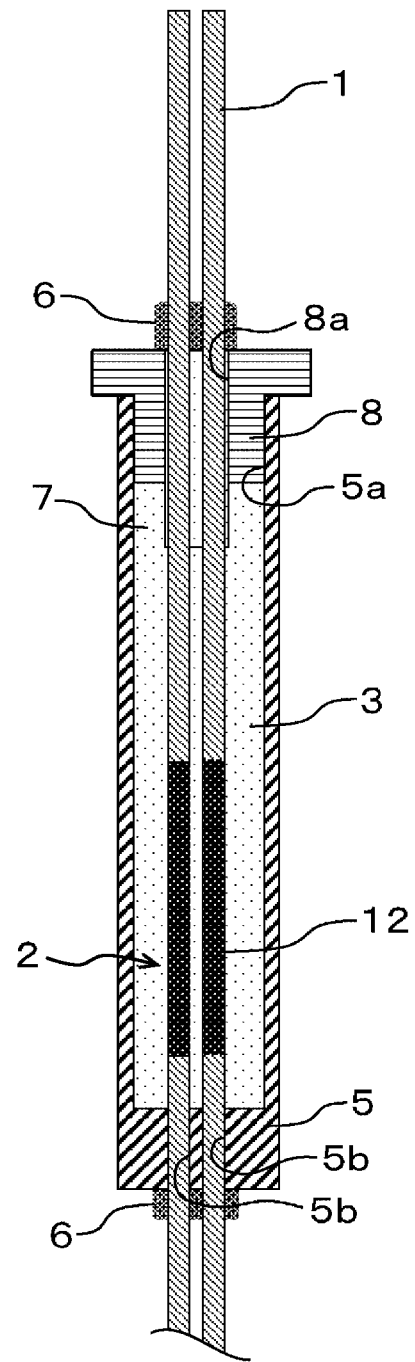

[FIG. 16]
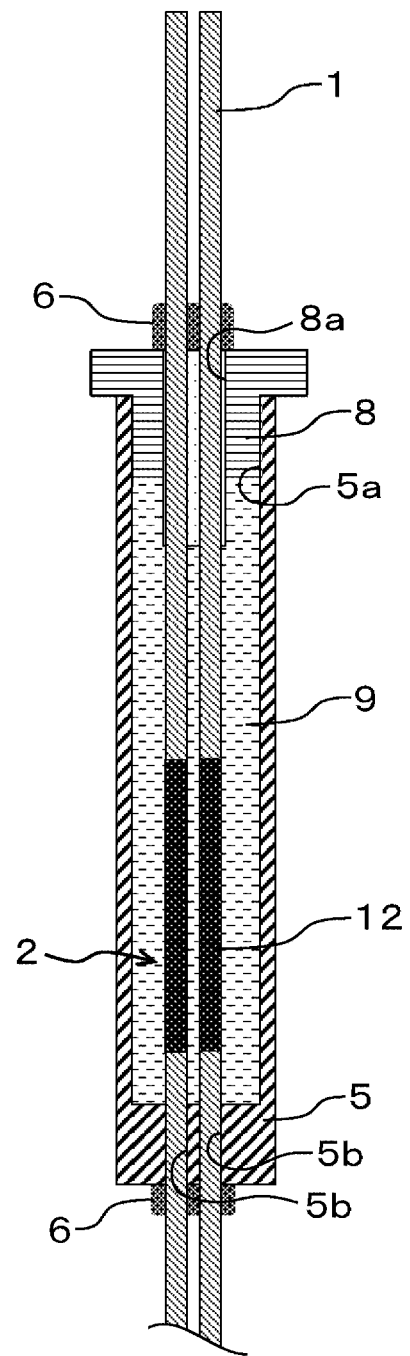

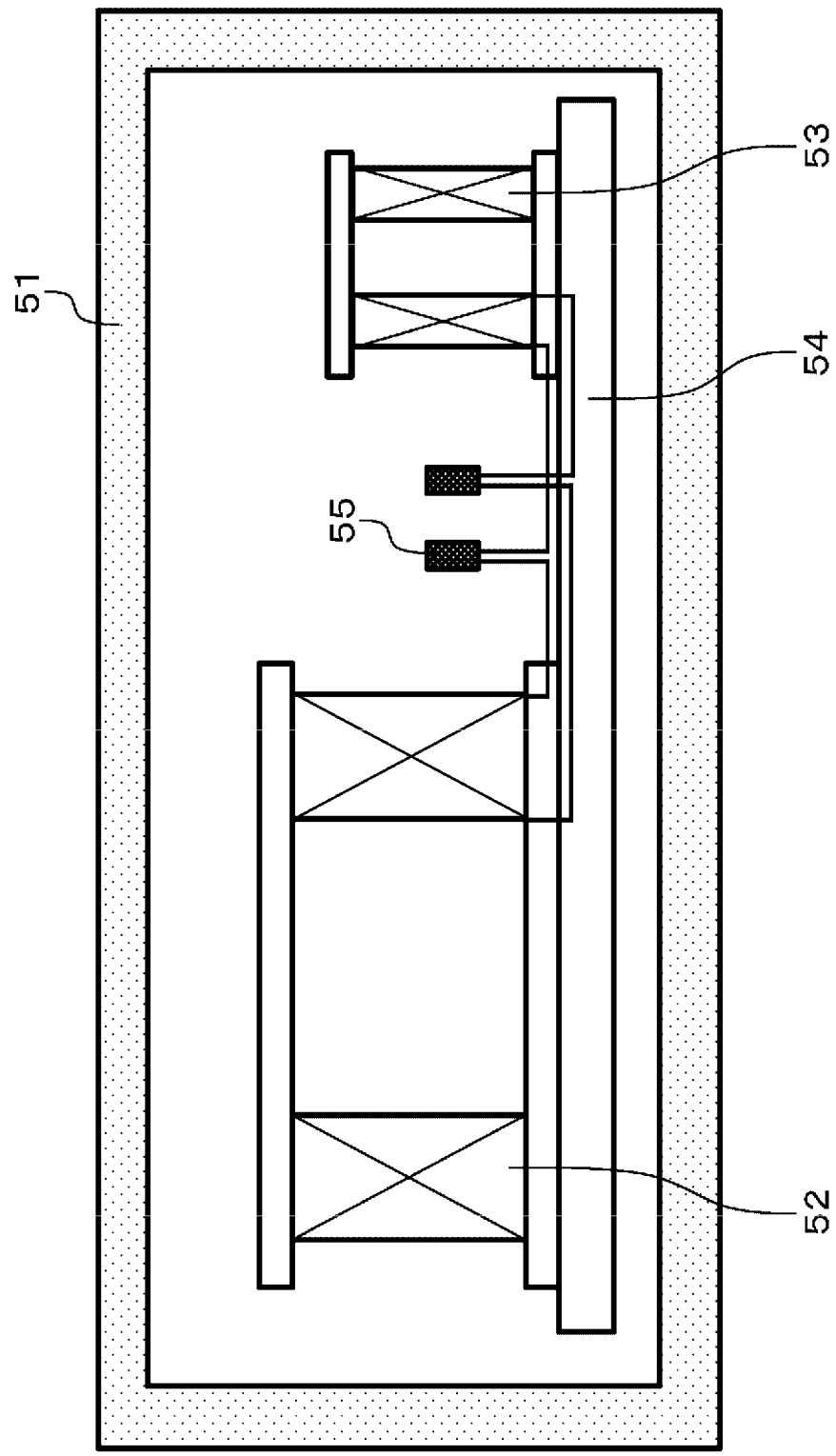
[FIG. 17]

CONNECTION PORTION FOR SUPERCONDUCTING WIRE AND METHOD FOR CONNECTING SUPERCONDUCTING WIRE

TECHNICAL FIELD

The present invention relates to a connection portion for a superconducting wire (or an $MgB_2$ wire) using magnesium diboride ($MgB_2$), and a method for connecting a superconducting wire in which $MgB_2$ wires are superconductively connected.

BACKGROUND ART

A superconducting magnet is used for a magnetic resonance imaging (MRI) apparatus or a nuclear magnetic resonance (NMR) apparatus. Since the MRI apparatus or the NMR apparatus requires high stability of a magnetic field, a persistent current mode operation is performed in a closed circuit formed of a superconductor.

FIG. 17 is a cross-sectional view schematically showing an example of a superconducting magnet.

As shown in FIG. 17, a superconducting magnet 50 includes a cooling container 51, a superconducting coil 52, a persistent current switch 53, a support plate 54, and a superconducting connection portion 55.

The cooling container 51 houses the superconducting coil 52, the persistent current switch 53, and the support plate 54. The superconducting coil 52 and the persistent current switch 53 are supported on the support plate 54. The superconducting coil 52 and the persistent current switch 53 are conductively cooled by a refrigerator (not shown) through the support plate 54.

The superconducting coil 52 is electrically connected to a power supply (not shown) through current leads. In FIG. 17, the superconducting connection portion 55 in which superconducting wires are connected is provided between the superconducting coil 52 and the persistent current switch 53. In a state where the persistent current switch 53 is OFF, an excitation current is supplied from the power supply to the superconducting coil 52, and the superconducting coil 52 is excited.

When the persistent current switch 53 is transferred to a superconducting state, the persistent current switch 53 is switched to an ON state, and a persistent current that does not attenuate flows through a closed circuit configured with the superconducting coil 52 and the persistent current switch 53. In the persistent current mode, a static magnetic field having high stability of a magnetic field is obtained by the superconducting magnet 50.

In the persistent current mode, since the current flows through the closed circuit with substantially zero resistance, a technique for superconductively connecting the superconducting coil 52, the persistent current switch 53, and wires connecting the superconducting coil 52 and the persistent current switch 53 is required. It is required to connect the superconducting wires in a portion such as the superconducting connection portion 55 via a superconductor.

In the related art, superconducting wires made from niobium titanium (NbTi), niobium tritin ($Nb_3Sn$), or the like have been used for the superconducting magnet. Since these superconducting wires have a low critical temperature, cooling by liquid helium is performed. For such superconducting wires having a low critical temperature, a technique for superconducting connection using a superconducting solder such as a lead-bismuth (PbBi) alloy is established.

In recent years, magnesium diboride ($MgB_2$), which is a superconductor with a higher critical temperature than NbTi, $Nb_3Sn$, or the like has been discovered. $MgB_2$ does not require cooling by liquid helium and can be cooled by a refrigerator. In addition, $MgB_2$ has higher stability of a magnetic field than the superconductor in the related art and is suitable for the persistent current mode operation. Therefore, a practical application of $MgB_2$ is expected.

The critical temperature of $MgB_2$ is approximately 39 K, whereas a critical temperature of a superconducting solder in the related art is less than 10 K. When the superconducting solder is used, an operating temperature as a whole is restricted to below the critical temperature of superconducting solder, so that the superconducting solder in the related art cannot be used for the $MgB_2$ wire. Under such circumstances, development of a technique for appropriately superconductively connecting $MgB_2$ wires is advanced.

PTL 1 describes a technique for superconductively connecting $MgB_2$ wires in a connection metal tube filled with a superconducting solder while being in contact with each other via a superconductive coating layer. The $MgB_2$ wires are superconductively connected while being inserted into the connection metal tube. Such a superconducting connection using the superconducting solder is used for general superconducting wires such as NbTi.

PTL 2 describes a technique for performing superconducting connection by inserting a plurality of superconducting wires into a connection container, filling the container with a mixed powder of magnesium and boron, and pressurizing and heat-treating the mixed powder. In PTL 2, the mixed powder of magnesium and boron filled in the container is heat-treated to generate a sintered body of $MgB_2$ between the superconducting wires.

PTL 3 describes a method for disposing Mg to be adjacent to superconducting wires inserted into the connection container. The connection container is provided with an opening in a direction different from an insertion direction of the superconducting wires, and a metal pin for pressurization is inserted through the opening.

CITATION LIST

Non Patent Literature

PTL 1: JP2006-174546A
PTL 2: JP2012-094413A
PTL 3: JP2017-208156A

SUMMARY OF INVENTION

Technical Problem

In the technique described in PTL 1, a superconducting solder having a low critical temperature of about 9 K is used. Therefore, it is necessary to cool the superconducting wire to a temperature equal to or lower than the critical temperature of the superconducting solder. For example, when the $MgB_2$ wire is used for the superconducting magnet, the operating temperature as a whole including a winding portion needs to be equal to or less than the critical temperature of the superconducting solder. In such a technique, an advantage of $MgB_2$ having a high critical temperature cannot be utilized sufficiently.

In the technique described in PTL 2, the superconducting wires are superconductively connected in the container by the sintered body containing $MgB_2$. However, in the container, most of the superconducting wires are not fixed. In PTL 1, the superconducting wire is fixed with the superconducting solder over the entire interior of the container. On the other hand, in PTL 2, the superconducting wire is fixed only near the opening of the container or at a portion where the superconducting wire is in contact with the sintered body containing $MgB_2$.

As disclosed in PTL 2, in a case where a region that is not fixed to the periphery of the superconducting wire is present, when an electromagnetic force acts on the superconducting wire due to energization of a transport current, a mechanical load is applied to fixing portions on both sides of the superconducting wire. A portion where a superconducting filament and the sintered body containing $MgB_2$ are bonded is mechanically brittle. When the mechanical load is applied to the portion, energization characteristics such as a critical current density may be deteriorated.

In the technique described in PTL 3, before a heat treatment for generating the sintered body containing $MgB_2$, Mg is excessively filled, and after the heat treatment, the solder is poured into the sintered body to obtain high energization characteristics with a small variation. However, when a stabilizing material such as copper or copper alloy that hinders the generation of $MgB_2$ is used in the superconducting wire, since the stabilizing material reacts with Mg, the generation of $MgB_2$ is hindered, and the energization characteristics vary.

In the techniques described in PTLs 2 and 3, an opening for charging a raw material powder and inserting a pressurizing member is provided separately from the opening for inserting the superconducting wire into the container used for the superconducting connection. The raw material powder filled in the container is pressurized in a direction substantially orthogonal to a longitudinal direction of the superconducting wire inserted into the container. However, by using such a pressurization method, a force in a bending direction is applied to the superconducting wire, so that a crack may be generated in the superconducting filament and the energization characteristics may be deteriorated.

PTL 3 discloses that a container used for the superconducting connection is provided with one opening used for inserting the superconducting wire, charging the raw material powder, inserting the metal pin, and the like. In this container, the superconducting wire is inserted along an inner wall surface of the opening. However, when the superconducting wire is inserted along the inner wall surface, only one side of the superconducting filament comes into contact with the sintered body containing $MgB_2$. Since a contact area between the superconducting filament and the sintered body containing $MgB_2$ becomes small, the energization characteristics of the connection portion may be deteriorated.

In the techniques described in PTLs 2 and 3, when the superconducting wire is inserted into the connection container, a terminal of the superconducting wire is obliquely cut to form an acute angle. By cutting in this way, the contact area between the superconducting filament and the sintered body containing $MgB_2$ is increased, so that it is possible to improve the energization characteristics of the connection portion. However, while a temperature of a heat treatment for generating the sintered body containing $MgB_2$ is a high temperature of 500° C. to 900° C., the operating temperature of the superconducting magnet is a low temperature around −234° C. When the terminal of the superconducting wire is obliquely cut, a length of the superconducting wire differs between a tip end side which is an acute angle and an opposite side of the tip end side which is an obtuse angle. Therefore, when the superconducting wire is cooled after the heat treatment, the superconducting wire is warped due to a thermal stress. When the superconducting wire is warped in the container, the superconducting filament is peeled off from the sintered body containing $MgB_2$, so that the energization characteristics are deteriorated.

Accordingly, an object of the invention is to provide a connection portion for a superconducting wire and a method for connecting a superconducting wire, in which a plurality of superconducting wires are integrated by a sintered body containing $MgB_2$ and high energization characteristics can be obtained.

Solution to Problem

As a result of studies to solve the above problems, the present inventors found that the above problems can be solved by improving a structure in which a superconducting filament and a sintered body containing $MgB_2$ are brought into contact with each other, a method for pressurizing a raw material powder filled in a connection container, and a structure of the container, and completed the invention.

In order to solve the above problems, a connection portion for a superconducting wire according to the present invention is a connection portion for a superconducting wire in which a plurality of superconducting wires are integrated by a sintered body containing $MgB_2$. Each of the superconducting wires includes a superconducting filament, and end portions of the superconducting wires each having an outer peripheral surface of the superconducting filament exposed are inserted into a container in parallel. The container has an opening having a diameter larger than a wire diameter of the superconducting wires on at least one side in a longitudinal direction of the superconducting wires inserted into the container, and the sintered body is in contact with the outer peripheral surface of the superconducting filament of each of the superconducting wires in the container.

A method for connecting a superconducting wire according to the invention is a method for connecting a superconducting wire in which a plurality of superconducting wires are integrated by a sintered body containing $MgB_2$. The method includes: removing a metal sheath of each of the superconducting wires to expose an outer peripheral surface of a superconducting filament; inserting the superconducting wires, each having the superconducting filament exposed, into a container in parallel; filling the container with a raw material of $MgB_2$; and heat-treating the raw material filled in the container to generate the sintered body containing $MgB_2$. The container has an opening having a diameter larger than a wire diameter of the superconducting wires on at least one side in a longitudinal direction of the superconducting wires inserted into the container, and the raw material filled in the container is pressurized in parallel to the longitudinal direction of the superconducting wires by inserting a pressurizing jig or a lid member into the opening, and then heat-treated.

Advantageous Effects of Invention

The invention provides the connection portion for a superconducting wire and the method for connecting a superconducting wire, in which a plurality of superconducting wires are integrated by a sintered body containing $MgB_2$ and high energization characteristics can be obtained.

BRIEF DESCRIPTION OF DRAWINGS

FIG. 1 is a diagram showing a structure of a connection portion where superconducting wires are superconductively connected.

FIG. 2 is a diagram showing a structure of an end portion of a superconducting wire.

FIG. 3 is a diagram showing a cross-sectional structure of the superconducting wire.

FIG. 4 is a diagram showing a position where a metal sheath of the superconducting wire is removed.

FIG. 5 is a diagram showing a state in which superconducting wires are inserted into a connection container.

FIG. 6 is a diagram showing a state in which the connection container into which the superconducting wires are inserted is filled with a boron powder.

FIG. 7 is a diagram showing a state in which the boron powder filled in the connection container is pressurized.

FIG. 8 is a diagram showing a state in which the connection container filled with the boron powder is filled with magnesium.

FIG. 9 is a diagram showing a state in which the connection container filled with magnesium and boron is subjected to a heat treatment.

FIG. 10 is a diagram showing a position where a metal sheath of a superconducting wire according to a modification is removed.

FIG. 11 is a diagram showing a state in which the connection container filled with the boron powder is filled with magnesium.

FIG. 12 is a diagram showing a state in which the connection container filled with magnesium and boron is subjected to the heat treatment.

FIG. 13 is a diagram showing a state in which the connection container filled with the boron powder is filled with magnesium.

FIG. 14 is a diagram showing a state in which the connection container filled with magnesium and boron is subjected to the heat treatment.

FIG. 15 is a diagram showing a state in which the connection container is filled with a mixed powder of magnesium and boron.

FIG. 16 is a diagram showing a state in which the connection container filled with the mixed powder of magnesium and boron is subjected to the heat treatment.

FIG. 17 is a cross-sectional view schematically showing an example of a superconducting magnet.

DESCRIPTION OF EMBODIMENTS

Hereinafter, a connection portion for a superconducting wire and a method for connecting a superconducting wire according to an embodiment of the invention will be described with reference to drawings. In the following drawings, common components are denoted by the same reference numerals, and repetitive descriptions thereof are omitted.

The connection portion for a superconducting wire according to the present embodiment has a structure in which a plurality of superconducting wires are integrated by a sintered body containing $MgB_2$. This connection portion for a superconducting wire includes the plurality of superconducting wires, the sintered body containing $MgB_2$, and a connection container for superconducting connection. The plurality of superconducting wires are superconductively connected by being integrated with each other by the sintered body containing $MgB_2$ inside the connection container.

Each of the superconducting wires includes a superconducting filament serving as a superconductor at a temperature equal to or lower than a critical temperature, and a metal sheath covering the superconducting filament. When the superconducting wires are superconductively connected, each superconducting wire is subjected to cutting, polishing, or the like to expose the superconducting filament covered with the metal sheath. Each superconducting wire with the superconducting filament exposed is inserted into the connection container, and a raw material powder of $MgB_2$ is filled in the container, and the raw material powder is pressurized and compacted.

When the raw material powder of $MgB_2$ is heat-treated after being filled and pressurized, the sintered body containing $MgB_2$ is generated between the exposed superconducting filaments by reaction sintering or sintering of particles. By such a method, the superconducting wires are integrated by the sintered body containing $MgB_2$, and a connection portion for a superconducting wire that can be energized in a superconducting state can be obtained.

In the related art, when the superconducting wires are superconductively connected, as described in PTLs 2 and 3, a terminal of each superconducting wire is subjected to cutting, polishing, or the like, and an end surface of the superconducting filament exposed at the terminal is exposed in a superconducting connection container. The sintered body containing $MgB_2$ is formed to be in contact with the end surface of the superconducting filament in the container.

In the related art, when the superconducting wires are superconductively connected, as described in PTL 2 and FIGS. 4 to 7 of PTL 3, after the superconducting connection container is filled with the raw material powder of $MgB_2$, the raw material powder is pressurized from a direction substantially orthogonal to a longitudinal direction of the superconducting wire. In the superconducting connection container, an insertion port for inserting a pressurizing jig is provided substantially orthogonal to an insertion port for inserting the superconducting wire.

As described in FIGS. 2 and 3 of PTL 3, the raw material powder of $MgB_2$ filled in the superconducting connection container may be pressurized from a direction parallel to the longitudinal direction of the superconducting wire, and the superconducting wire with the superconducting filament exposed to a terminal side is inserted along an inner wall of the superconducting connection container. The sintered body containing $MgB_2$ is in contact with only one side of the end surface of the superconducting filament, and is not in contact with an opposite side thereof.

In contrast, in the connection portion for a superconducting wire according to the present embodiment, the raw material powder of $MgB_2$ filled in the superconducting connection container is pressurized from a direction substantially parallel to the longitudinal direction of the superconducting wire, and the sintered body containing $MgB_2$ is in a state of being in contact with an outer peripheral surface of an intermediate portion near the terminal of the superconducting filament instead of the end surface of the superconducting filament.

In the present embodiment, the metal sheath covering the superconducting filament is removed not at the terminal of the superconducting wire but at the intermediate portion near the terminal. Therefore, the outer peripheral surface of the superconducting filament is exposed instead of the end surface of the superconducting filament. The superconducting wires are inserted in parallel such that outer peripheral surfaces of the exposed superconducting filaments are close to each other, and the superconducting wires are not inserted along the inner wall surface of the superconducting connection container, but are inserted toward a center side to be separated from the inner wall surface.

In such a state, the raw material powder of $MgB_2$ is filled in the superconducting connection container, the pressurizing jig is inserted into the container, and the raw material powder is pressurized in a direction substantially parallel to the longitudinal direction of the superconducting wire, that is, in a direction substantially the same as a direction in which the superconducting wire is inserted, and then the raw material powder is subjected to a heat treatment for generating the sintered body containing $MgB_2$, and the superconducting wires are superconductively connected by the sintered body containing $MgB_2$. The pressurization in the direction substantially parallel to the longitudinal direction of the superconducting wire is performed at least on a boron powder, and preferably on both the boron powder and magnesium.

For example, an $MgB_2$ wire having a superconducting filament formed from $MgB_2$ can be used as the superconducting wire to be superconductively connected by the sintered body containing $MgB_2$. When the $MgB_2$ wire is used, an operating temperature as a whole including the connection portion can be set to a high temperature close to 39 K, which is a critical temperature of $MgB_2$, as compared with the case of using a superconducting solder having a critical temperature of about 9 K in the related art.

A superconducting wire in which a superconducting filament is formed from NbTi, $Nb_3Sn$, or the like can also be used as the superconducting wire to be superconductively connected by the sintered body containing $MgB_2$. Even in the case of using a wire other than the $MgB_2$ wire, since the superconducting wires are connected via the $MgB_2$ wire having a high critical temperature, superconducting connection having higher stability can be obtained as compared with the case of using the superconducting solder in the related art.

Hereinafter, a specific description of the connection portion for a superconducting wire and the method for connecting a superconducting wire will be given by taking, as an example, a case where an $MgB_2$ wire with a multi-filament structure having a superconducting filament formed from $MgB_2$ is used as the superconducting wire to be superconductively connected by the sintered body containing $MgB_2$.

FIG. 1 is a diagram showing a structure of a connection portion where the superconducting wires are superconductively connected.

FIG. 1 shows a structure in which two superconducting wires 1 are superconductively connected to each other inside a connection container 5. The connection container 5 is sealed with a lid member 8 provided in a structure through which the superconducting wires 1 penetrate. A sintered body 9 containing $MgB_2$ is formed inside the connection container 5.

As shown in FIG. 1, the connection container 5 is provided in a cylindrical shape with a bottom. The connection container 5 has an opening 5a at one end. The opening 5a is used not only for passing end portion sides of the superconducting wires 1, but also for charging the raw material powder of $MgB_2$ and inserting the pressurizing jig for pressurizing the raw material powder. The lid member 8 is attached to the opening 5a to seal the connection container 5.

The connection container 5 has two through holes 5b at the other end located opposite to the opening 5a to correspond to the two superconducting wires 1 superconductively connected to each other. The through holes 5b are used for passing the end portion sides of the superconducting wires 1. The through holes 5b are provided near the center of a bottom portion of the connection container 5. The terminal sides of the superconducting wires 1 passed through the through holes 5b are supported near the center separated from an inner wall surface of the connection container 5.

The two superconducting wires 1 superconductively connected to each other penetrate the connection container 5 in the longitudinal direction, and end portion sides of the superconducting wires 1 pass through the through holes 5b such that the intermediate portions 2 near the terminals of the superconducting wires 1 are positioned in the container, and the two superconducting wires 1 are drawn out to an opening 5a side. The connection container 5 has a structure in which the superconducting wires 1 penetrate the connection container 5 such that the two superconducting wires 1 are superconductively connected to each other at the intermediate portions 2 close to the terminals.

The connection container 5 is formed of a material that withstands a high temperature of 600° C. or higher and is difficult to react with magnesium or boron during the heat treatment. Examples of the material of the connection container 5 include Fe, Ni, Nb, Ta, and alloys thereof. Since these materials hardly react with magnesium and boron during the heat treatment for generating the sintered body 9 containing $MgB_2$, it is possible to generate the sintered body 9 having a high uniformity.

A diameter of the through hole 5b can be set to be slightly larger than a wire diameter of the $MgB_2$ wire 1. With such a diameter, since the superconducting wires 1 are respectively supported by inner walls of the through holes 5b, the superconducting wires 1 to be superconductively connected to each other can be fixed to the connection container 5 at least one portion. When the superconducting wires 1 are fixed at one or more portions, the terminal sides of the superconducting wires 1 can be kept stationary near the center separated from the inner wall surface of the connection container 5 during the filling, the pressurization, the heat treatment, or the like of the raw material powder. Therefore, the bond between an exposed superconducting filament 12 and the sintered body 9 containing $MgB_2$ can be densified. With such a diameter, a gap between the superconducting wire 1 and the through hole 5b is reduced, so that it is possible to easily prevent leakage of the raw material powder and to perform sealing during the heat treatment.

FIG. 2 is a diagram showing a structure of the end portion of the superconducting wire. FIG. 3 is a diagram showing a cross-sectional structure of the superconducting wire.

As shown in FIGS. 2 and 3, the superconducting wire 1, which is an $MgB_2$ wire, includes a metal sheath 11 and core portions (12, 13, and 14) covered with the metal sheath 11. The core portion includes the superconducting filament 12 formed from $MgB_2$, a stabilizing material 13 for ensuring electrical stability and thermal stability of the superconducting, and a base material 14 covering an outer periphery of the superconducting filament 12.

The superconducting wire 1 is provided as a multi-filament structure having a plurality of superconducting filaments 12. In general, multi-filament wires are widely used from the viewpoint of current capacity, wire length, electromagnetic stability, AC loss, and the like. In FIG. 3, eight superconducting filaments 12 are disposed in a circular shape. However, the number and arrangement of the superconducting filaments 12 are not particularly limited as long as a loss is reduced and a required operating current can flow.

As shown in FIG. 3, the superconducting wire 1 includes the stabilizing material 13 at a central portion inside the superconducting filament 12. Outside the stabilizing material 13, the plurality of superconducting filaments 12 are regularly arranged at intervals in a circumferential direction of the wire. The outer periphery of each superconducting filament 12 is individually covered with the base material 14. The tubular metal sheath 11 is disposed outside the superconducting filament 12 and the base material 14.

In general, the $MgB_2$ wire is produced by a powder in tube (PIT) method. The PIT method is a method for filling a metal tube with a raw material powder and performing wire drawing on the metal tube. Therefore, in the superconducting wire 1 which is an $MgB_2$ wire, the base material 14 covering the superconducting filament 12 is formed of the metal tube used for filling with the raw material powder.

The metal tube filled with the raw material powder of $MgB_2$ is made of a barrier material that hardly reacts with magnesium and boron. The barrier material is a material for preventing reaction between the raw material powder of $MgB_2$ and copper or the like used as the stabilizing material 13 during the heat treatment for generating $MgB_2$. Examples of the barrier material include Fe, Ni, Nb, Ta, and alloys thereof.

FIG. 4 is a diagram showing a position where the metal sheath of the superconducting wire is removed.

FIG. 4 shows a position where the metal sheath 11 is removed to expose the superconducting filament 12 when the superconducting wires 1 are superconductively connected to each other. A surface or a cross-section is exposed as an outer peripheral surface of the superconducting filament 12, and the metal sheath 11 is removed such that the stabilizing material 13 disposed at the center of the superconducting wire 1 is not exposed.

As shown in FIG. 4, when the superconducting wires 1 are superconductively connected to each other, the metal sheath 11 at the intermediate portion 2 near the terminal of each of the superconducting wires 1 is removed such that the outer peripheral surface of each superconducting filament 12 is exposed. In FIG. 4, the metal sheath 11 is removed over an entire circumference of the intermediate portion 2 of the superconducting wire 1. As a method for removing the metal sheath 11, mechanical cutting, mechanical polishing, chemical polishing such as etching, electrical cutting such as discharge machining, electrical polishing such as electrolytic polishing, and the like can be used.

In a case where the metal sheath 11 of each superconducting wire 1 at the intermediate portion 2 is removed, unlike the case where the metal sheath 11 at the terminal is removed, when the superconducting wires 1 are inserted into the connection container 5, the end surface of the superconducting filament 12 is not exposed, and only the outer peripheral surface of the superconducting filament 12 can be exposed in the container. When the outer peripheral surface of the superconducting filament 12 is exposed, unlike the case where the end surface of the superconducting filament 12 is exposed, it is possible to prevent the stabilizing material 13 disposed at the center of the superconducting wire 1 from coming into contact with the raw material powder filled in the connection container 5.

It is known that copper or the like used as the stabilizing material 13 reacts with magnesium or boron during the heat treatment to hinder the generation of $MgB_2$. When the outer peripheral surface of the superconducting filament 12 is exposed, the stabilizing material 13 does not come into contact with the raw material powder filled in the connection container 5, and the generation of $MgB_2$ is less likely to be hindered. Therefore, the sintered body 9 containing $MgB_2$ having a high uniformity can be generated in close contact with the superconducting filament 12 to form a connection portion having good energization characteristics.

FIG. 5 is a diagram showing a state in which superconducting wires are inserted into the connection container. FIG. 6 is a diagram showing a state in which the connection container into which the superconducting wires are inserted is filled with the boron powder. FIGS. 5 and 6 are cross-sectional views taken along a line I-I of FIG. 1 with respect to a structure of the container.

FIG. 5 shows a state in which the two superconducting wires 1 each of which the metal sheath 11 at the intermediate portion 2 is removed are inserted into the connection container 5 in parallel. FIG. 6 shows a state in which the connection container 5 into which the superconducting wires 1 are inserted is filled with a boron powder 3 which is a raw material of $MgB_2$.

As shown in FIG. 5, when the superconducting wires 1 are superconductively connected to each other, terminals of the superconducting wires 1 pass through the through holes 5b of the connection container 5 and are drawn out toward a side of the opening 5a. When the superconducting wires 1 are inserted into the connection container 5, it is preferable that the intermediate portion 2 in which the superconducting filament 12 is exposed is disposed not on the side of the opening 5a of the connection container 5 but on a side of the through hole 5b.

When the intermediate portion 2 in which the superconducting filament 12 is exposed is disposed on the side of the through hole 5b, the boron powder 3 filled near the intermediate portion 2 can be appropriately pressurized by the pressurizing jig inserted from the opening 5a. When the boron powder 3 is compacted, the sintered body 9 containing $MgB_2$ having a high uniformity and a small number of coarse voids can be generated in close contact with the superconducting filament 12, so that the connection portion having good energization characteristics can be formed.

When the superconducting wires 1 are superconductively connected, the superconducting filament 12 may be in a state in which $MgB_2$ is generated, or in a state in which magnesium and boron are not reacted. When the superconducting filament 12 is in a state in which magnesium and boron are not reacted, a heat treatment is also applied to the superconducting wire 1 during the heat treatment for generating the sintered body 9 containing $MgB_2$, and $MgB_2$ as the superconducting filament 12 can be generated.

As shown in FIG. 6, after the superconducting wires 1 are inserted into the connection container 5, the connection container 5 is filled with the boron powder 3 as the raw material of $MgB_2$. Since the opening 5a of the connection container 5 is provided with a diameter that allows the two superconducting wires 1 to be superconductively connected to each other to be inserted and the pressurizing jig 4 to be inserted, the boron powder 3 can be inserted through the opening 5a into which the superconducting wires 1 are inserted.

It is preferable to increase a bulk density of the boron powder 3 charged into the connection container 5 by manual tapping or minute vibration by a vortex mixer or the like. The reaction between magnesium and boron proceeds as the molten and volatilized magnesium diffuses into boron particles during the heat treatment. Therefore, when a filling rate of the boron powder 3 is increased, the sintered body 9 containing the dense $MgB_2$ having a small number of coarse voids can be generated.

The boron powder 3 may be dispersed in a dispersion medium such as water to form a slurry, and the slurry may be applied to the intermediate portion 2 or the like in which the superconducting filament 12 is exposed. When the slurry of the boron powder 3 is applied to a surface of the superconducting filament 12 and dried, the boron powder 3 can be attached at a high density. When the boron powder 3 is reacted with magnesium in such a state, the sintered body 9 containing $MgB_2$ can be generated in close contact with the superconducting filament 12, a connection portion having good energization characteristics can be formed.

FIG. 7 is a diagram showing a state in which the boron powder filled in the connection container is pressurized. FIG. 7 is a cross-sectional view taken along a line I-I of FIG. 1 with respect to the structure of the container.

FIG. 7 shows a state in which the boron powder 3, which is the raw material of $MgB_2$, is filled in the connection container 5 into which the superconducting wires 1 are inserted, and then the pressurizing jig 4 for pressurizing the powder is inserted and the boron powder 3 is pressurized.

As shown in FIG. 7, after the connection container 5 is filled with the boron powder 3, the pressurizing jig 4 is inserted into the opening 5a. The pressurizing jig 4 is pressed by a press machine or the like, and the boron powder 3 in the container is pressurized, and the periphery of the exposed superconducting filament 12 is compacted. When the boron powder 3 and magnesium are reacted in such a state, the sintered body 9 containing $MgB_2$ having a high uniformity can be generated, so that a connection portion having good energization characteristics can be formed.

The pressurizing jig 4 has a substantially cylindrical shape with a flange portion provided on one end side, and a through hole 4a provided in the center. A cylindrical portion of the pressurizing jig 4 has a slightly smaller diameter than an inner diameter of the connection container 5, and the pressurizing jig 4 can be inserted into the opening 5a of the connection container 5. The through hole 4a preferably has a diameter slightly larger than the total of wire diameters of the two superconducting wires 1 such that the boron powder 3 does not leak out and the two superconducting wires 1 can be inserted therethrough. Alternatively, two through holes may be provided corresponding to the two superconducting wires 1 to be superconductively connected to each other. The pressurizing jig 4 can be formed of a material similar to that of the connection container 5 or a material having strength capable of withstanding pressurization.

The boron powder 3 filled in the connection container 5 is pressurized in parallel to the longitudinal direction of the superconducting wire 1 by inserting the pressurizing jig 4 into the opening 5a of the connection container 5 into which the superconducting wires 1 are inserted. By using such a pressurization method, it is possible to prevent the application of a force in a bending direction to the superconducting filament 12 when the raw material powder of $MgB_2$ is compacted, as compared with the case where the raw material powder of $MgB_2$ is pressurized in a direction substantially orthogonal to the longitudinal direction of the superconducting wire 1. Since a bending deformation of the superconducting filament 12 and a thermal strain generated after the heat treatment are reduced, and the generation of cracks or the like in the superconducting filament 12 is reduced, a connection portion having good energization characteristics can be formed.

FIG. 8 is a diagram showing a state in which the connection container filled with the boron powder is filled with magnesium. FIG. 9 is a diagram showing a state in which the connection container filled with magnesium and boron is subjected to a heat treatment. FIGS. 8 and 9 are cross-sectional views taken along the line I-I of FIG. 1 with respect to the structure of the container.

FIG. 8 shows a state in which magnesium 7, which is a raw material of $MgB_2$, is filled in the connection container 5 in which the superconducting wires 1 are inserted and then the boron powder 3 is filled and pressurized. FIG. 9 shows a state in which the boron powder 3 and the magnesium 7 are filled and pressurized and then heat-treated to generate the sintered body 9 containing $MgB_2$.

As shown in FIG. 8, after the boron powder 3 is filled in the connection container 5 and is pressurized by inserting the pressurizing jig 4, the pressurizing jig 4 is pulled out from the connection container 5, and the magnesium 7 is filled onto the compacted boron powder 3. The magnesium is volatilized and melted at a temperature lower than that of boron, and diffuses to a boron side of a solid to proceed the reaction. Therefore, as the magnesium of the raw material of $MgB_2$, either a powder or a metal ingot can be used. However, when the powder is used, it is preferable to sufficiently pressurize the powder after being filled in the connection container 5.

As shown in FIG. 9, after the boron powder 3 and the magnesium 7 are filled in the connection container 5 and pressurized, the opening 5a of the connection container 5 is sealed. The opening 5a can be sealed using the lid member 8. Sealing the opening 5a can prevent the volatilized magnesium during the heat treatment from leaking out of the container, so that the sintered body 9 containing $MgB_2$ having a high uniformity can be generated.

The lid member 8 has a substantially cylindrical shape with a flange portion provided on one end side, and a through hole 8a provided in the center. A cylindrical portion of the lid member 8 has a slightly smaller diameter than the inner diameter of the connection container 5, and the lid member 8 can be inserted into the opening 5a of the connection container 5. The through hole 8a preferably has a diameter slightly larger than the total of the wire diameters of the two superconducting wires 1 such that the two superconducting wires 1 can be inserted therethrough while the connection container 5 is sealed. Alternatively, two through holes may be provided corresponding to the two superconducting wires 1 to be superconductively connected to each other. The lid member 8 can be made of the same material as the connection container 5.

When the magnesium 7 is filled in the connection container 5 filled with the boron powder 3, the lid member 8 having both a pressurizing function and a sealing function is inserted into the opening 5a of the connection container 5 into which the superconducting wires 1 are inserted, or a pressurizing jig is re-inserted to pressurize the magnesium 7 in parallel to the longitudinal direction of the superconducting wire 1. By using such a pressurization method, it is possible to prevent the application of the force in the bending direction to the superconducting filament 12, as compared with the case where the raw material powder is pressurized in a direction substantially orthogonal to the longitudinal direction of the superconducting wire 1.

As shown in FIG. 9, the boron powder 3 and the magnesium 7 are filled in the connection container 5, the connection container 5 is sealed, and then the raw material powder is heat-treated to generate the sintered body 9 containing $MgB_2$. The heat treatment can be performed, for example, in an electric furnace. An atmosphere for the heat treatment is preferably an atmosphere of an inert gas such as argon gas or nitrogen gas.

A temperature of the heat treatment is preferably 500° C. to 900° C., more preferably 650° C. to 850° C. When the temperature of the heat treatment is 650° C. or higher, magnesium is heated to a temperature equal to or higher than a melting point, so that liquid magnesium can be caused to flow and diffuse. Therefore, the reaction and sintering for generating $MgB_2$ can be promoted. When the temperature of the heat treatment is 850° C. or less, magnesium is hardly volatilized, so that leakage to the outside of the container can be prevented.

When the boron powder 3 and the magnesium 7 are heat-treated, a connection portion for a superconducting wire in which the superconducting wires 1 are integrated by the sintered body 9 containing $MgB_2$ is obtained. The sintered body 9 containing $MgB_2$ has a smaller volume than the raw material powder due to the reaction between magnesium and boron, and is in contact with the outer peripheral surface of the superconducting filament 12 instead of the end surface of the superconducting filament 12. Since the superconducting wires 1 are inserted into the center side to be separated from the inner wall surface of the connection container 5, a state in which the sintered body 9 containing $MgB_2$ is filled over an entire circumference of the superconducting wires 1 is obtained between the superconducting wires 1 inserted into the connection container 5 and the connection container 5.

In the sintered body 9 containing $MgB_2$, a filling rate of $MgB_2$ is preferably 70 vol % or more. As the filling rate of $MgB_2$ is higher, the energization characteristics of the connection portion for a superconducting wire can be improved. The filling rate of $MgB_2$ can be obtained by a method for preparing the raw material powder of $MgB_2$ using a mechanical mill method, a method for appropriately pressurizing the raw material powder, or the like. In the present specification, the filling rate of $MgB_2$ means a ratio of regions other than voids in the sintered body containing $MgB_2$.

According to the connection portion for a superconducting wire and the method for connecting a superconducting wire, since the connection container used for the superconducting connection or the pressurizing jig used for the pressurization of the raw material powder has an opening having a diameter larger than the wire diameter of the superconducting wires on at least one side in the longitudinal direction of the superconducting wire inserted into the connection container, the raw material powder filled in the connection container can be pressurized in parallel to the longitudinal direction of the superconducting wires. Since the periphery of the exposed superconducting filament can be compacted without applying the force in the bending direction to the superconducting wire or the superconducting filament, even if the volume decrease due to the reaction between magnesium and boron occurs, coarse voids are less likely to be generated, and a sintered body having a high uniformity is easily generated. Therefore, it is possible to obtain a connection portion that has good energization characteristics such as critical current and critical current density and that has small variations in energization characteristics for each region.

According to the connection portion for a superconducting wire and the method for connecting a superconducting wire, the metal sheath of the superconducting wire positioned at the intermediate portion in the longitudinal direction is removed, and the sintered body containing $MgB_2$ comes into contact with the outer peripheral surface of each of the superconducting filaments of the superconducting wire inside the connection container. Therefore, unlike the case where the end surfaces of the superconducting filaments are obliquely cut and brought into contact with each other, lengths of the superconducting filaments can be made uniform. Since the warping due to the thermal stress can be prevented, a contact area between the superconducting filament and the sintered body containing $MgB_2$ can be ensured while avoiding the superconducting filament from peeling off from the sintered body containing $MgB_2$. When the metal sheath positioned at the intermediate portion is removed, the stabilizing material at the center of the wire is prevented from hindering the generation of $MgB_2$.

Since a linear expansion coefficient of $MgB_2$ is relatively low, a linear expansion coefficient of the metal sheath is usually larger than a linear expansion coefficient of the sintered body containing $MgB_2$. In such a case, even when the terminal of the wire is not obliquely cut, a large difference in thermal strain occurs between the metal sheath 11 and the sintered body 9 containing $MgB_2$ when the wire is cooled after the heat treatment. Since the metal sheath 11 is greatly thermally shrunk, a deviation may occur in an interface where the superconducting filament 12 and the sintered body 9 containing $MgB_2$ are bonded to each other, and the energization characteristics of the connection portion may be deteriorated.

On the other hand, in the connection portion for a superconducting wire and the method for connecting a superconducting wire described above, since the sintered body containing $MgB_2$ is brought into contact with the outer peripheral surface of the superconducting filament 12, an influence of a difference in linear expansion coefficient between the metal sheath 11 and $MgB_2$ becomes small. Thermal shrinkage occurring after the heat treatment is dominant in the longitudinal direction of the wire. However, since the metal sheath 11 and the like positioned at the intermediate portion 2 in the longitudinal direction of the wire are removed, it is possible to prevent the superconducting filament 12 from being thermally strained along the longitudinal direction of the wire. Therefore, the superconducting filament 12 can be prevented from being peeled off from the sintered body 9 containing $MgB_2$, and high energization characteristics can be obtained.

According to the connection portion for a superconducting wire and the method for connecting a superconducting wire described above, the superconducting wires are inserted into the center side to be separated from the inner wall surface of the connection container, a state in which the sintered body containing $MgB_2$ is filled over the entire circumference of the superconducting wires 1 is obtained between the superconducting wires inserted into the connection container and the connection container. Therefore, unlike the case where the superconducting wire is inserted along the inner wall surface of the connection container, the contact area between the superconducting filament and the sintered body containing $MgB_2$ can be easily secured. Since the raw material powder filled in the connection container is pressurized in parallel to the longitudinal direction of the superconducting wire, the periphery of the superconducting wire inserted into the center side can be uniformly compacted. Therefore, the sintered body containing $MgB_2$ having a high uniformity can be generated in close contact with the superconducting filament to form a connection portion having good energization characteristics.

Hereinafter, a connection portion for a superconducting wire and a method for connecting a superconducting wire according to a modification will be described with reference to drawings.

FIG. 10 is a diagram showing a position where a metal sheath of a superconducting wire according to the modification is removed.

As shown in FIG. 10, in place of the wire (see FIG. 4) in which the metal sheath 11 is removed over the entire circumference of the intermediate portion of the wire, a superconducting wire 1A in which only a part of the metal sheath 11 in a circumferential direction of the intermediate portion of the wire is removed can also be used as a superconducting wire to be superconductively connected by the sintered body containing $MgB_2$.

In FIG. 10, the metal sheath 11 and the base material 14 on an outer side of the superconducting filament 12 are removed from portions that are positioned point-symmetrically with respect to a central axis of the wire. The metal sheath 11 and the base material 14 are removed at portions extending in the longitudinal direction of the wire on one side of the outer peripheral surface of the wire and on the opposite side which is point-symmetrical thereto.

The portions where the metal sheath 11 and the base material 14 are removed have a width shorter than half a circumferential length of the wire. A length of the portions where the metal sheath 11 and the base material 14 are removed can be determined such that a predetermined exposed area is secured for the superconducting filament 12 and the contact area allows a required operating current to flow to the sintered body 9 containing $MgB_2$.

Terminal sides and center sides of the core portions (12, 13, 14) of the wire are connected in the longitudinal direction of the wire by the metal sheath 11 left point-symmetrically with respect to the central axis of the wire. As a method for removing the metal sheath 11 or the like, mechanical cutting, mechanical polishing, chemical polishing such as etching, electrical cutting such as discharge machining, electrical polishing such as electrolytic polishing, and the like can be used.

In FIG. 10, the metal sheath 11 and the base material 14 are removed at two portions that are positioned point-symmetrically with respect to the central axis of the wire, and the number of portions to be removed, lengths of the portions in the longitudinal direction of the wire, widths of the portions in the circumferential direction of the wire, positions of the portions in the circumferential direction of the wire, and the like are not particularly limited. The portions where the metal sheath 11 and the base material 14 are removed preferably have the same length in the longitudinal direction and the same width in the circumferential direction (partial circumferential length).

FIG. 11 is a diagram showing a state in which the connection container filled with the boron powder is filled with magnesium. FIG. 12 is a diagram showing a state in which the connection container filled with magnesium and boron is subjected to heat treatment.

FIG. 11 shows a state in which the superconducting wires 1A according to the modification are inserted, and then the magnesium 7, which is a raw material of $MgB_2$, is filled in the connection container 5 in which the boron powder 3 is filled and pressurized, and the lid member 8 having both the pressurizing function and the sealing function is inserted and pressurizes. FIG. 12 shows a state in which the boron powder 3 and the magnesium 7 are filled and pressurized and then heat-treated to generate the sintered body 9 containing $MgB_2$.

As shown in FIGS. 11 and 12, as in the case of superconductively connecting the superconducting wires 1, the superconducting wires 1A are inserted into the connection container 5, the boron powder 3 is filled in the connection container 5, the pressurizing jig 4 is inserted and the boron powder 3 is pressurized, and then the pressurizing jig 4 is removed from the connection container 5, the magnesium 7 is filled onto the boron powder 3 compacted by pressurization, and re-pressurization is performed as necessary. The connection container 5 is sealed, and the raw material powder is subjected to the heat treatment to generate the sintered body 9 containing $MgB_2$.

The boron powder 3 filled in the connection container 5 is pressurized in parallel to the longitudinal direction of the superconducting wire 1A by inserting the pressurizing jig 4 into the opening 5a of the connection container 5 into which the superconducting wire 1A is inserted. When the magnesium 7 is filled in the connection container 5 filled with the boron powder 3, the lid member 8 having both the pressurizing function and the sealing function is inserted into the opening 5a of the connection container 5 into which the superconducting wire 1A is inserted, or a pressurizing jig is re-inserted to pressurize the magnesium 7 in parallel to the longitudinal direction of the superconducting wire 1A.

According to the connection portion for a superconducting wire and the method for connecting a superconducting wire in the modification described above, since a part of the metal sheath 11 in the circumferential direction of the superconducting wire 1A is removed, unlike the case of removing the metal sheath 11 over the entire circumference of the wire, both sides in the longitudinal direction of the wire with respect to the portion where the metal sheath 11 is removed can be connected by the metal sheath 11 which is not removed. Since the metal sheath 11 on both the terminal side and the center side of the portion where the metal sheath 11 is removed is restrained with respect to the deformation, when the wire is cooled after the heat treatment, the thermal strain generated in the longitudinal direction of the wire can be prevented.

In particular, when the portions that are positioned point-symmetrically with respect to the central axis of the wire are removed, the thermal shrinkage is less likely to be biased with respect to the central axis of the wire, so that the wire is less likely to be warped due to the thermal strain. Therefore, the superconducting filament 12 can be prevented from being peeled off from the sintered body 9 containing $MgB_2$. Since the raw material powder of $MgB_2$ filled in the connection container 5 is pressurized from a direction substantially parallel to the longitudinal direction of the wire, the pressure can be uniformly applied to each portion where the metal sheath 11 is removed, unlike the case where the raw material powder is pressurized in a direction substantially orthogonal to the longitudinal direction of the wire. Therefore, it is advantageous to generate a uniform sintered body in the circumferential direction of the wire.

FIG. 13 is a diagram showing a state in which the connection container filled with the boron powder is filled with magnesium. FIG. 14 is a diagram showing a state in which the connection container filled with magnesium and boron is subjected to the heat treatment.

FIG. 13 shows a state in which the magnesium 7, which is a raw material of $MgB_2$, is filled in the connection container 5 in which the superconducting wires 1 are inserted and then the boron powder 3 is filled and pressurized. FIG. 14 shows a state in which the boron powder 3 and the magnesium 7 are filled and pressurized and then heat-treated to generate the sintered body 9 containing $MgB_2$.

As shown in FIGS. 13 and 14, in the connection container 5 before the heat treatment, a gap between the through hole 5b of the connection container 5 and the wire, a gap between the opening 8a of the lid member 8 and the wire, and the like can be sealed with a heat resistant adhesive 6. As the heat resistant adhesive 6, a heat-resistant ceramic bond or the like can be used.

When the heat resistant adhesive 6 is used to seal the connection container 5, even in a case where the connection container 5 is provided with the opening 5a larger than the wire diameter of the wire and the through hole 5b through which the wire passes, these portions can be appropriately sealed. Since the leakage of the volatilized magnesium and the mixing of impurities can be prevented, a sintered body having a high uniformity can be generated, and a connection portion having good energization characteristics can be formed.

When the heat resistant adhesive 6 is used to seal the connection container 5, the superconducting wires 1 are bonded to the connection container 5 and the lid member 8, so that the superconducting wires 1 to be superconductively connected to each other can be fixed to the connection container 5 or the lid member 8 that seals the connection container 5 at least at one portion. When the superconducting wires 1 are fixed at one or more portions, terminal sides of the superconducting wires 1 can be kept stationary near the center separated from the inner wall surface of the connection container 5 during the heat treatment or the like of the raw material powder. Therefore, the bond between an exposed superconducting filament 12 and the sintered body 9 containing $MgB_2$ can be densified.

FIG. 15 is a diagram showing a state in which the connection container is filled with a mixed powder of magnesium and boron. FIG. 16 is a diagram showing a state in which the connection container filled with the mixed powder of magnesium and boron is subjected to the heat treatment.

FIG. 15 shows a state in which a mixed powder of the magnesium 7 and the boron powder 3, which is a raw material of $MgB_2$, is filled in the connection container 5 into which the superconducting wires 1 are inserted, and then the lid member 8 having both the pressurizing function and the sealing function is inserted and pressurizes. FIG. 16 shows a state in which the mixed powder are filled and pressurized and then heat-treated to generate the sintered body 9 containing $MgB_2$.

As shown in FIG. 15, the connection container 5 into which the superconducting wires 1 are inserted may be filled with the mixed powder of the magnesium 7 and the boron powder 3 mixed in advance. The mixed powder of the magnesium 7 and the boron powder 3 is preferably prepared using the mechanical mill method. The mechanical mill method is a method in which powder particles are violently collided with media such as a zirconia ball or an inner wall of a pot to perform pulverization and mixing while strongly working.

According to the mechanical mill method, boron particles are kneaded into magnesium to obtain a finely dispersed powder structure in which boron is encapsulated in magnesium. Therefore, a sintered body containing $MgB_2$ having a high uniformity, a high filling rate and a small number of coarse voids can be obtained. When the mechanical mill method is used, it is preferable to add a collision energy of such an extent that $MgB_2$ is not clearly generated. The fact that $MgB_2$ is not clearly formed means that a peak of $MgB_2$ is not substantially confirmed in powder X-ray diffraction.

As shown in FIGS. 15 and 16, as in the case of superconductively connecting the superconducting wires 1, the superconducting wires 1 are inserted into the connection container 5, the mixed powder of the magnesium 7 and the boron powder 3 is filled in the connection container 5, and the filled mixed powder is pressurized. The connection container 5 is sealed, and the raw material powder is heat-treated to generate the sintered body 9 containing $MgB_2$.

The mixed powder of the magnesium 7 and the boron powder 3 filled in the connection container 5 is pressurized in parallel to the longitudinal direction of the superconducting wire 1 by inserting the lid member 8 having both the pressurizing function and the sealing function or a pressurizing jig into the opening 5a of the connection container 5 in which the superconducting wires 1 are inserted. When using a pressurizing jig that has a low heat resistance and is not formed of a barrier material, it is preferable to remove the pressurizing jig before the heat treatment and seal the connection container 5 with a lid member formed of a barrier material having a sealing function.

According to the connection portion for a superconducting wire and the method for connecting a superconducting wire in the modification described above, since the mixed powder of the magnesium 7 and the boron powder 3 is filled in the connection container 5 and the mixed powder is pressurized in parallel to the longitudinal direction of the superconducting wire 1, the raw material powder around the exposed superconducting filament can be compacted without applying a force in the bending direction to the superconducting wire or the superconducting filament. When the mixed powder of the magnesium 7 and the boron powder 3 is used, there is no need to add the magnesium 7 onto the boron powder 3, and the raw material powder can be compacted by a single pressurizing operation. Therefore, there is no need to prepare a plurality of pressurizing jigs and members with different lengths.

Although the embodiments of the invention have been described above, the invention is not limited to the embodiments described above, and various modifications can be made without departing from the spirit of the invention. For example, the invention is not necessarily limited to those including all the configurations in the embodiments described above. A part of a configuration of an embodiment may be replaced with another configuration, may be added to another embodiment, or may be omitted.

For example, according to the connection portion for a superconducting wire and the method for connecting a superconducting wire in the above-described embodiments, two superconducting wires each having a single-core wire structure are superconductively connected in parallel to each other. However, the structures, the number, and the arrangement of the superconducting wires to be superconductively connected are not particularly limited. The superconducting wire may have either a single-core structure or a multi-core structure. The number of superconducting wires to be superconductively connected may be two, or may be three or more. The superconducting wires may be inserted in parallel into the container for superconducting connection, or may be inserted from opposite directions to the container for superconducting connection.

The pressurization method for pressurizing the raw material powder of $MgB_2$ in parallel to the longitudinal direction of the superconducting wire can be performed using a pressurizing jig in which an opening having a diameter larger than the total of the wire diameters of the superconducting wires to be superconductively connected to each other is provided on at least one side in the longitudinal direction of the connection container, and a through hole is provided. In the connection portion for a superconducting wire and the method for connecting a superconducting wire, such a large diameter opening is provided on one side in the longitudinal direction of the connection container, and openings may be provided on both sides in the longitudinal direction. When the openings are provided on both sides, it is preferable to use a method for inserting a pressurizing jig from both sides or a method for closing one of the openings and pressurizing.

According to the connection portion for a superconducting wire and the method for connecting a superconducting wire in the above-described embodiments, a pressurizing jig is used as means for pressurizing the boron powder, and a lid member having both a pressurizing function and a sealing function may be used instead of the pressurizing jig. That is, the pressurization of the boron powder, the pressurization of the magnesium powder, and the sealing of the container can be performed by inserting and removing one jig and member. Such a lid member is preferably formed of a barrier material having heat resistance.

REFERENCE SIGNS LIST 1 superconducting wire
2 intermediate portion
3 boron powder
4 pressurizing jig
5 connection container (container)
5a opening
5b through hole
6 heat resistant adhesive
7 magnesium
8 lid member
9 sintered body containing $MgB_2$
11 metal sheath
12 superconducting filament
13 stabilizing material
14 base material

The invention claimed is:

1. A connection portion for a superconducting wire in which a plurality of superconducting wires are integrated by a sintered body containing $MgB_2$, wherein
    each of the superconducting wires includes a superconducting filament, and end portions of the superconducting wires each having an outer peripheral surface of the superconducting filament exposed are inserted into a container in parallel,
    the container has an opening having a diameter larger than a wire diameter of the superconducting wires on at least one side in a longitudinal direction of the superconducting wires inserted into the container,
    the sintered body is in contact with the outer peripheral surface of the superconducting filament of each of the superconducting wires inside the container,
    the superconducting wires are inserted into a center side of the container to be separated from an inner wall surface of the container,
    the sintered body is filled between the superconducting wires inserted into the container and the container,
    the superconducting wires are positioned parallel to a pressurization direction of a raw material of $MgB_2$ used to form the sintered body, and
    the superconducting filament is made from $MgB_2$.

2. The connection portion for a superconducting wire according to claim 1, wherein
    the superconducting wire includes the superconducting filament and a metal sheath covering an outer periphery of the superconducting filament, and
    a portion of the metal sheath positioned at an intermediate portion in the longitudinal direction of the superconducting wire is removed such that the outer peripheral surface of the superconducting filament is exposed.

3. The connection portion for a superconducting wire according to claim 1, wherein
    the superconducting wire includes the superconducting filament and a metal sheath covering an outer periphery of the superconducting filament,
    portions of the metal sheath that are positioned point-symmetrically with respect to a central axis of the superconducting wire are removed, and
    the sintered body is in contact with the outer peripheral surface of the superconducting filament on both sides of the central axis.

4. The connection portion for a superconducting wire according to claim 1, wherein
    the superconducting wire is fixed at one or more portions to the container or a lid member that seals the container.

5. The connection portion for a superconducting wire according to claim 1, wherein
    the sintered body has a filling rate of $MgB_2$ of 70% by volume or more.

6. The connection portion for a superconducting wire according to claim 1, wherein
    the superconducting filament is made from $MgB_2$.

7. The connection portion for a superconducting wire according to claim 2, wherein
    the superconducting filament is made from $MgB_2$.

8. The connection portion for a superconducting wire according to claim 3, wherein
    the superconducting filament is made from $MgB_2$.

9. The connection portion for a superconducting wire according to claim 4, wherein
    the superconducting filament is made from $MgB_2$.

10. The connection portion for a superconducting wire according to claim 2, wherein
    the sintered body has a filling rate of $MgB_2$ of 70% by volume or more.

11. The connection portion for a superconducting wire according to claim 3, wherein
    the sintered body has a filling rate of $MgB_2$ of 70% by volume or more.

12. The connection portion for a superconducting wire according to claim 4, wherein
    the sintered body has a filling rate of $MgB_2$ of 70% by volume or more.

13. A method for connecting a superconducting wire in which a plurality of superconducting wires are integrated by a sintered body containing $MgB_2$, the method comprising:
    removing a metal sheath of each of the superconducting wires to expose an outer peripheral surface of a superconducting filament;
    inserting the superconducting wires, each having the superconducting filament exposed, into a container in parallel;
    filling the container with a raw material of $MgB_2$; and
    heat-treating the raw material filled in the container to generate the sintered body containing $MgB_2$, wherein
    the container has an opening having a diameter larger than a wire diameter of the superconducting wires on at least one side in a longitudinal direction of the superconducting wires inserted into the container, and
    the raw material filled in the container is pressurized in parallel to the longitudinal direction of the superconducting wires by inserting a pressurizing jig or a lid member into the opening, and then heat-treated.

* * * * *